United States Patent
Kinoshita et al.

[11] Patent Number: 6,073,965
[45] Date of Patent: Jun. 13, 2000

[54] TILT HOLDING FORCE ADJUSTING MECHANISM FOR STEERING COLUMN

[75] Inventors: Satoshi Kinoshita; Yota Uesaka, both of Aichi, Japan

[73] Assignee: Fuji Kiko Co., Ltd., Tokyo, Japan

[21] Appl. No.: 09/007,514

[22] Filed: Jan. 15, 1998

[30] Foreign Application Priority Data

Jan. 31, 1997 [JP] Japan .................................. 9-018284

[51] Int. Cl.⁷ .................. B62D 1/18; B62D 1/16
[52] U.S. Cl. ................................... 280/775; 280/779
[58] Field of Search .................... 280/775, 779; 74/493; 411/531, 161

[56] References Cited

U.S. PATENT DOCUMENTS

| | | | |
|---|---|---|---|
| 2,191,101 | 2/1940 | Stellin | 411/161 |
| 4,284,114 | 8/1981 | Korenobu | 411/119 |
| 5,117,707 | 6/1992 | Kinoshita et al. | 74/493 |
| 5,199,319 | 4/1993 | Fujiu | 74/493 |
| 5,598,741 | 2/1997 | Mitchell et al. | 74/493 |
| 5,632,567 | 5/1997 | Lowe et al. | 403/3 |

FOREIGN PATENT DOCUMENTS

| | | |
|---|---|---|
| 51-36836 | 3/1976 | Japan . |
| 58-15572 | 1/1983 | Japan . |
| 58-116475 | 8/1983 | Japan . |
| 8-53070 | 2/1996 | Japan . |
| 2 287 773 | 9/1995 | United Kingdom . |

*Primary Examiner*—Paul N. Dickson
*Assistant Examiner*—Faye M. Fleming
*Attorney, Agent, or Firm*—Foley & Lardner

[57] ABSTRACT

In a steering column assembly with a tilt holding force adjustment mechanism, a distance bracket member supporting a steering column is disposed between side walls of an upper clamp member fixed to a vehicle body. A tilt bolt passes through elongate apertures formed in the side walls of the upper clamp member, and bolt holes formed in the distance bracket member. A tilt lever is screwed on a first end of the tilt bolt. A tilt bolt stopper is mounted on a second end of the tilt bolt. The tilt bolt stopper has a washer portion loosely fitting over the second end of the tilt bolt, and an engaging portion engaging with the distance bracket or one of the elongate apertures. The tilt bolt stopper is clamped between a flange of the tilt bolt and a stopper fixing nut screwed on a threaded portion formed at the second end of the tilt bolt.

21 Claims, 4 Drawing Sheets

TILT HOLDING FORCE ADJUSTING MECHANISM FOR STEERING COLUMN

BACKGROUND OF THE INVENTION

The present invention relates to a tilt holding force adjusting mechanism for a steering column, and more specifically to a tilt holding force adjusting mechanism enabling fine adjustment of a tightening force in a tightening operation of a tilt lever on a tilt bolt.

In a tilt steering column, a distance bracket is fixed and released in an upper clamp by applying or removing a tightening force of a tilt bolt tightening the upper clamp with a rotatable tilt lever. In the released state, the distance bracket is movable up and down, and the steering column supported by the distance bracket is adjustable at a desired inclined angle.

As shown in FIG. 7, a jacket tube 2 receives a rotatable steering shaft 1 coaxially. The jacket tube 2 is fixedly mounted on the distance bracket 3. The distance bracket 3 is movable up and down in the upper clamp 4 fixed to a vehicle body. A tilt bolt 6 passes through vertically elongated apertures 5 formed in right and left side walls of the upper clamp 4 and holes of the distance bracket 3. A first end portion of the tilt bolt 6 engages a tilt lever 7 and a second end portion of the tilt bolt 6 engages a tilt bolt stopper 8 serving as a rotation preventing detent member. These members constitute a tilt holding force adjusting mechanism. The upper clamp 4 can fasten or release the distance bracket 3 when the tilt lever 7 is rotated in a forward or reverse direction.

As shown in FIG. 8, the first end of the tilt bolt 6 has a threaded portion 9. A nut 10 is fixed to the tilt lever 7, and screwed on the threaded portion 9. The second end portion of the tilt bolt 6 is integrally formed with an outward flange 11. Serrations 12 are formed on the outside periphery of the flange 11. The tilt bolt stopper 8 has a hole and first and second projections 14. Serrations 13 are formed on the inside circumferential surface of the hole of the tilt bolt stopper 8. The hole of the stopper 8 receives the flange 11, and the external serrations 12 of the flange 11 engage with the internal serrations 13 of the hole. The projections 14 of the tilt bolt stopper 8 are integrally formed in the stopper 8 at diametrically opposite positions across the hole. The projections 14 engage in one of the elongated apertures 5 of the upper clamp 4 and thereby prevent rotation. When the tilt lever 7 is operated rotationally, the tilt bolt 6 is prevented from rotation. A push nut 15 holds the tilt bolt stopper 8 on the second end of the tilt bolt 6 by pressing the tilt bolt stopper 8 to the side wall of the upper clamp 4 in order to prevent falling.

The threaded portion 9 of the tilt bolt 6 is in the form of left hand screw in order that the upper clamp 4 fixes the distance bracket 3 when the tilt lever 7 is operated in the direction of lifting.

In the conventional tilt holding force adjusting mechanism of the tilt bolt 6 and the tilt bolt stopper 8, however, the adjustment of the clamping force of the upper clamp 4 clamping the distance bracket 3 requires the disengagement and reengagement of the serrations 12 and 13. The adjustment of the clamping force minutely requires a complicated and time-consuming operation to adjust tooth by tooth by dismantling and reassembling the adjusting mechanism.

SUMMARY OF THE INVENTION

It is an object of the present invention to provide the tilt holding force adjusting mechanism of the steering column enabling stepless adjustment.

According to the present invention, an assembly for supporting a steering column of a vehicle comprises:

a bracket structure comprising a distance bracket member for supporting the steering column, and an upper clamp member for supporting the distance bracket member, said upper clamp member comprising first and second side walls each formed with an elongated aperture for allowing the distance bracket member to move between said first and second side walls to adjust a position of the steering column;

a tilt bolt passing through said distance bracket member and the elongate apertures of the upper clamp member, said tilt bolt comprising first and second end portions and an outward flange;

a tilt lever screwed on said first end portion of the tilt bolt; and an adjusting mechanism which comprises a bolt rotation stopper comprising a washer portion mounted on said second end portion of said tilt bolt, and an engaging portion engaging with said bracket structure, and a stopper fixing nut screwed on the second end portion of the tilt bolt for fixing said stopper to said tilt bolt.

After the tilt lever is screwed and tightened on the tilt bolt, the tilt bolt can be fixed with the tilt both stopper regardless of the rotational position of the tilt bolt. This allows stepless, continuous adjustment.

DETAILED DESCRIPTION OF THE INVENTION

Figure 1:
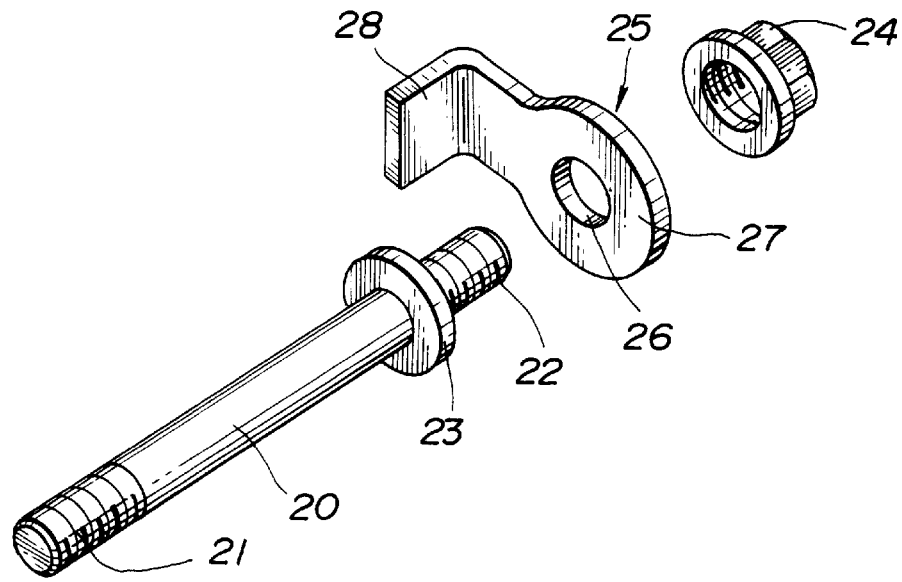
FIG. 1 is an exploded perspective view showing a main part of a tilt holding force adjusting mechanism according to a first embodiment of the present invention.
Figure 4:
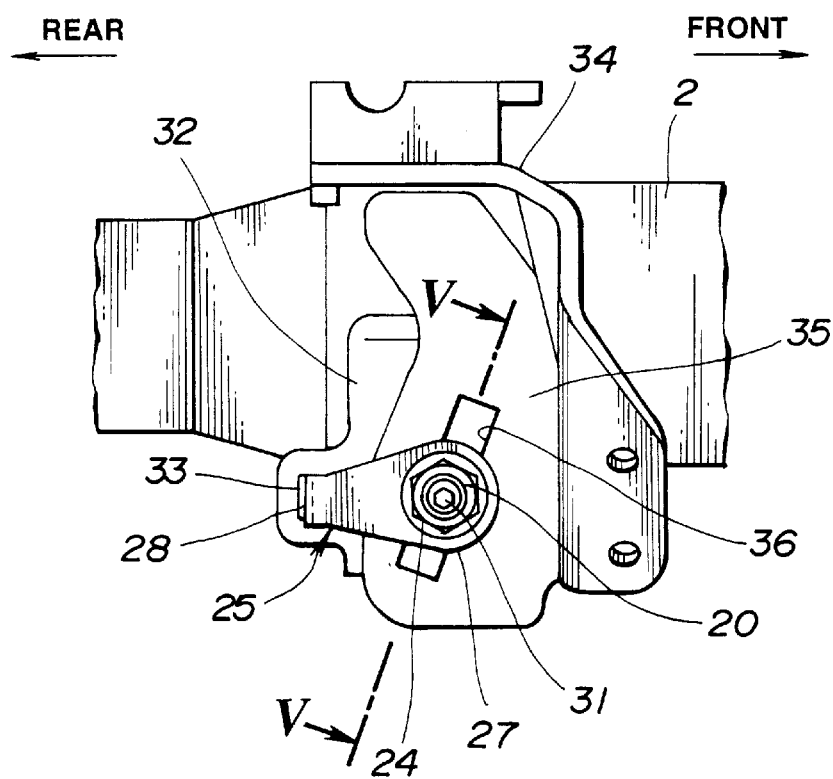
FIG. 4 is a side view showing the first embodiment in an assembled state.
Figure 5:
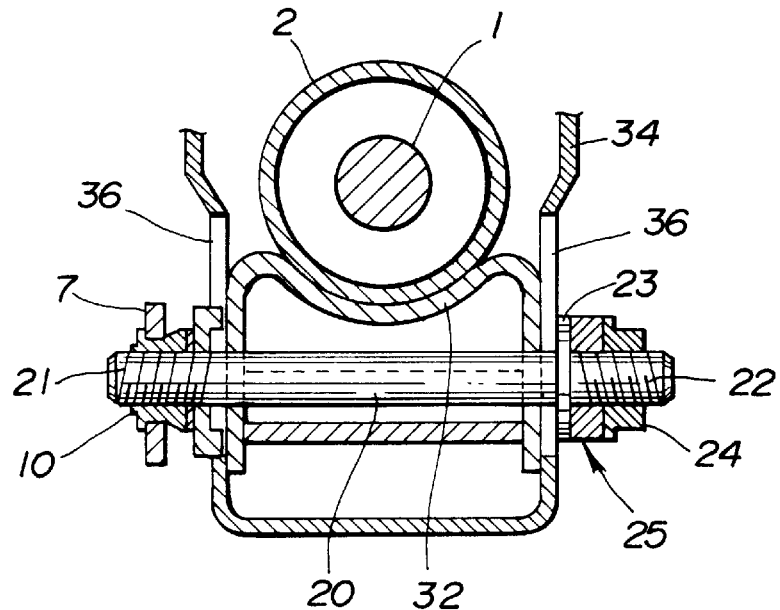
FIG. 5 is a sectional view taken across a line V—V of FIG. 4.
Figure 7:
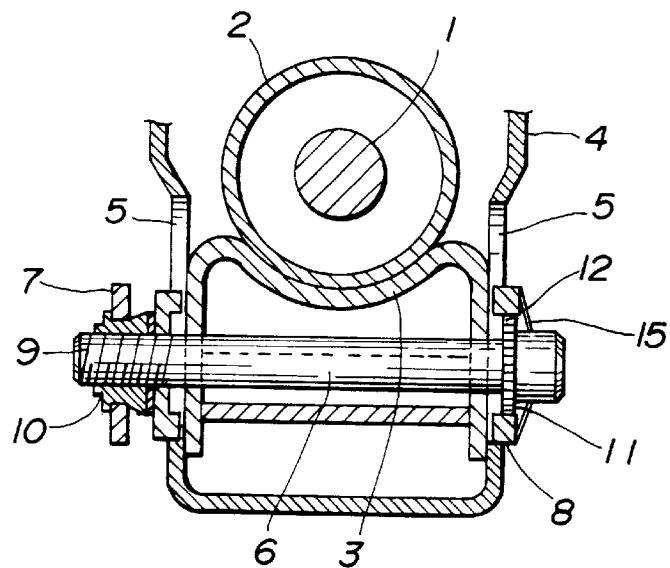
FIG. 7 is a sectional view showing a conventional tilt holding force adjusting mechanism.
Figure 8:
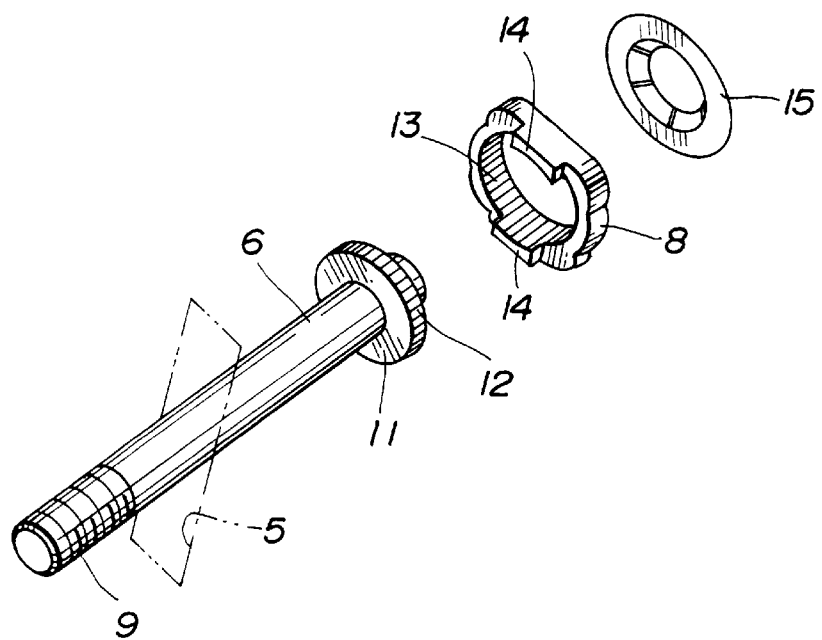
FIG. 8 is an exploded perspective view of a main part of FIG. 7.

The first embodiment of the present invention is shown in FIGS. 1, 4 and 5. A tilt steering column assembly shown in FIGS. 1, 4 and 5 includes a distance bracket member 32 for supporting the steering column, and an upper clamp member 34 for supporting the distance bracket member 32. The distance bracket member 32 and the upper clamp member 34 constitute a bracket structure for supporting the steering column. These members 32 and 34 are substantially identical with the distance bracket 3 and the upper clamp 4 of the conventional steering column assembly shown in FIG. 7. The upper clamp member 34 has first and second (or left and right) side walls 35 each formed with an elongated aperture (or elongated hole) 36 for allowing the distance bracket member 32 to move up and down between the first and second side walls 35 to adjust a position of the steering column. A tilt bolt 20 passes through holes of the distance bracket member 32 and the elongated apertures 36 of the upper clamp member 34.

As shown in FIG. 1 and FIGS. 4 and 5, the tilt bolt 20 has first and second threaded end portions 21 and 22 and an outward flange 23. The tilt bolt 20 has an intermediate shank extending between the first and second end portions 21 and 22. The intermediate shank is received in the upper clamp member 34. As viewed in FIG. 5, the first end portion 21 projects outward in one (leftward) direction from the first side wall 35 of the upper clamp member 34. The second end portion 22 projects outward in the opposite (rightward) direction from the second side wall 35 of the upper clamp member 34. The flange 23 is formed between the intermediate shank and the second end portion 22. The second end portion 22 projects from the flange 23. Serrations are not formed on the outside periphery of the flange 23 unlike said conventional example. The flange 23 of this example has a smooth cylindrical outside surface. The first threaded portion 21 of this tilt bolt 20 is formed as left-hand screw like the conventional example, but the second threaded portion 22 may be formed as either right-hand or left-hand screw. A fastening tool fitting non-circular portion 31 such as a non-circular recess or a non-circular projection is formed on the tip of the threaded portion 22. The non-circular portion 31 extends axially from the second end of the tilt bolt 20, and has a non-circular cross section. For example, the non-circular portion 31 has a polygonal cross section which is radially symmetrical around the axis of the bolt 20. In this example, the non-circular portion 31 is a hexagonal hole having a hexagonal cross section.

A nut 10 is fixed to a tilt lever 7. The nut 10 of the tilt lever 7 is screwed on the first threaded portion 21 like the conventional example.

A stopper fixing nut 24 and a tilt bolt rotation stopper 25 constitute an adjusting mechanism. The tilt bolt rotation stopper 25 comprises a washer portion 27 and an engaging portion 28. The washer portion 27 has a through hole 26 loosely fitting over the second threaded portion 22 of the tilt bolt 20. The inside surface defining the through hole 26 of this example is a smooth cylindrical surface, having no serrations. The engaging portion 28 extends radially and outwardly from the washer portion 27 and has a hooked end engaging with the distance bracket member 32. In this example, the distance bracket member 32 has a projecting portion projecting beyond the second side wall 35 of the upper clamp member 34. An engaging hole 33 is formed in the projecting portion of the distance bracket member 32. The hooked end of the engaging portion 28 of the bolt stopper 25 is received in the engaging hole 33 of the distance bracket member 32. The engaging portion 28 of the stopper 25 projects beyond the second side wall 35 of the upper clamp member 34. The tilt bolt stopper 25 is tightly locked by the stopper fixing nut 24 screwed on the second threaded portion 22 in the state in which the engaging portion 28 of the stopper 25 is engaged with the engaging hole 33 of the distance bracket 32. The threaded hole of the stopper fixing nut 24 passes through the nut 24, and the second end of the tilt bolt 20 projects from the nut 24 as shown in FIG. 5. The stopper fixing nut 24 of this example has an outward flange abutting on the washer portion 27 of the bolt stopper 25.

Figure 2:
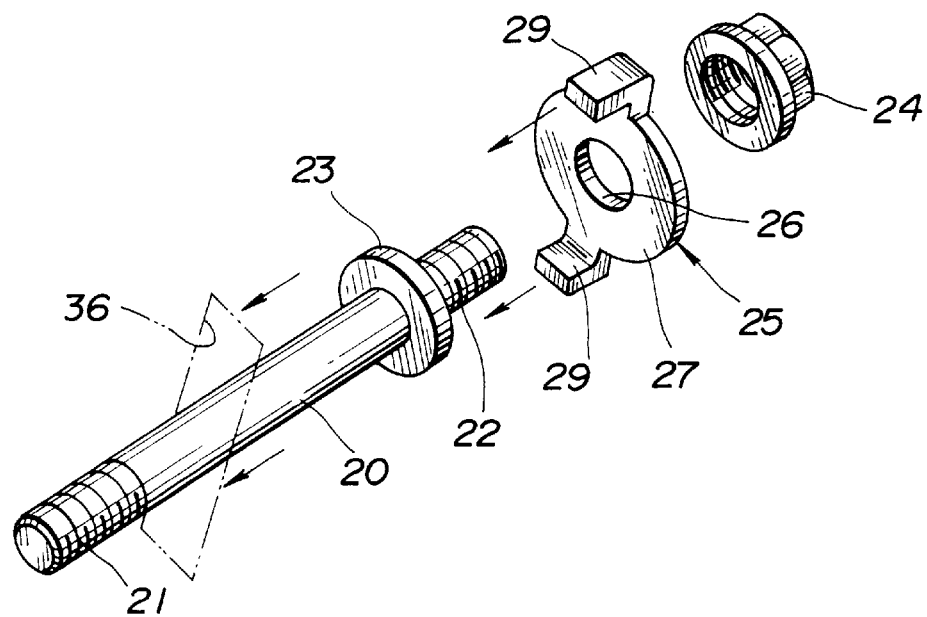
FIG. 2 is an exploded perspective view showing a main part of a tilt holding force adjusting mechanism according to a second embodiment of the present invention.

In the second embodiment shown in FIG. 2, a tilt bolt stopper 25 has a pair of engaging portions 29 and 29 which oppose each other diametrically in the washer portion 27 and which engage the elongated aperture 36 of the second side wall 35 of the upper clamp member 34.

Figure 3:
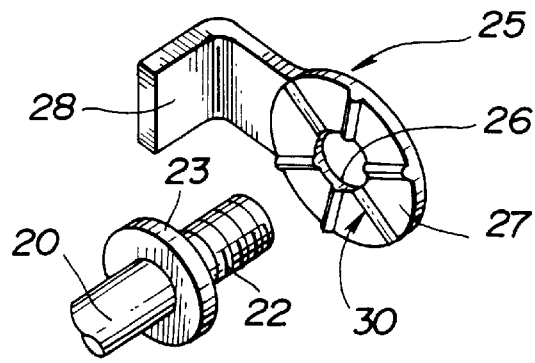
FIG. 3 is an exploded perspective view showing a tilt bolt stopper according to a third embodiment of the present invention.

In the third embodiment shown in FIG. 3, the washer portion 27 of a tilt bolt rotation stopper 25 has a non-flat side surface formed with a plurality of ribs 30 for assisting a friction fixation. The ribs 30 may be formed in the side surface of the flange 23 of the tilt bolt 20.

The engaging portion 28 in each of the examples of FIGS. 1 and 3 engages with the engaging hole 33 of the distance bracket 32 whereas the engaging portions 29 and 29 in FIG. 2 engage with the second side elongated aperture 36 of the upper clamp member 34.

In the first embodiment as shown in FIGS. 4 and 5, the tilt lever 7 is held stationary at a tightening position for tightening the tilt bolt 20 so as to produce a required holding force, and the upper clamp 34 is put in a state capable of clamping the distance bracket 32 firmly between both side walls 35. Then, the tilt bolt stopper 25 is mounted on the second threaded portion 22 of the tilt bolt 20 so that the threaded portion 22 is inserted into the through hole 26 and the engaging portion 28 of the tilt bolt stopper 25 is inserted into the engaging hole 33 of the distance bracket 32. In this state, the stopper fixing nut 24 is screwed on the threaded portion 22, so that the tilt bolt 20 and the tilt bolt stopper 25 are tightened and fixed together. The washer portion 27 of the stopper 25 is firmly clamped between the flange 23 of the tilt bolt 20 and the fixing nut 24.

Figure 6:
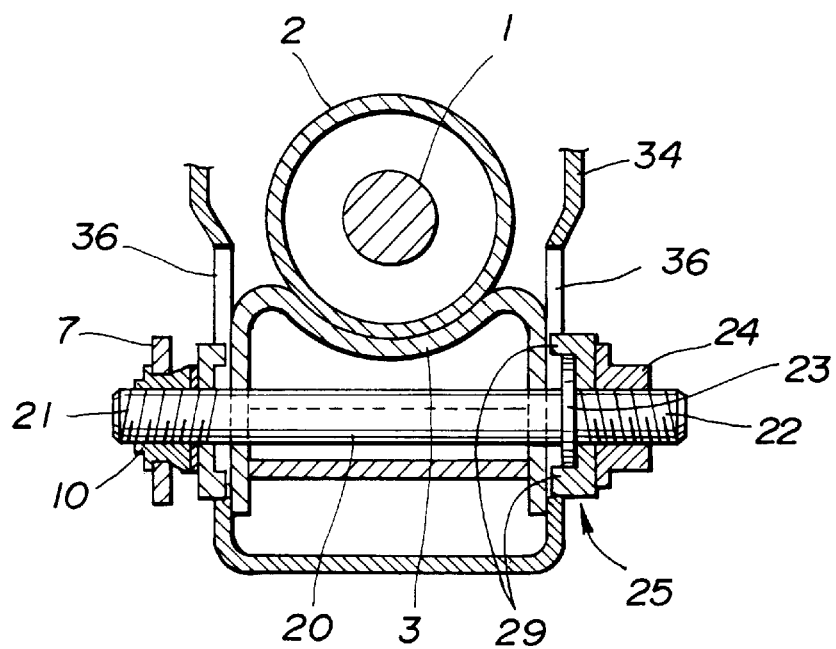
FIG. 6 is a sectional view similar to FIG. 5, but showing the second embodiment.

According to the second embodiment, as shown in FIG. 6, in the state in which the engaging portions 29 and 29 of the tilt bolt stopper 25 can be inserted into the second side elongated aperture 36 of the upper clamp member 34, the tilt bolt stopper 25 is mounted on the threaded portion 22 and tightly locked by the stopper fixing nut 24 screwed on said threaded portion 22.

When the tilt lever 7 is rotated in a releasing direction to loosen the tilt bolt 20 and to remove the clamping force of the distance bracket 32, the tilt bolt 20 becomes movable along the elongated apertures 36 formed in the side walls 35 of the upper clamp member 34.

In the first through third embodiments, the stopper fixing nut 24 can prevent looseness with a high bolt axial force (axial load) acting on the nut 24 screwed on the tilt bolt 20. However, it is optional to fix the stopper fixing nut 24 by caulking or staking as failsafe structure, or employ a caulking or staking nut as the stopper fixing nut 24. As other means for preventing looseness, it is optional to employ a technique of applying screw locking material to the threaded portion 22 and the stopper fixing nut 24, or a technique of engaging the stopper fixing nut 24 with a cut and bent portion formed in the tilt bolt stopper 25.

After the tilt lever is tightened on the tilt bolt 20 so as to produce a required holding force, the threaded portion 22 of the tilt bolt 20 is inserted into the hole 26 of the tilt bolt stopper 25 and the stopper fixing nut 24 is tightened onto the tilt bolt 20. Therefore, the locking between the tilt bolt 20 and the tilt bolt stopper 25 is stepless. The working efficiency of the process for making the tilt holding force adjusting mechanism improves. In case of readjustment, because it is not necessary to remove the tilt bolt stopper 25 and the stopper fixing nut 24, the adjustment is simple, quick, easy and superior in working efficiency. The tilt holding force adjusting mechanism mounted coaxially on the tilt bolt 20 does not increase the space, and is advantageous in compactness.

The present invention eliminates the necessity of serration and thereby facilitate the machining and processing step for manufacturing the tilt holding force adjusting mechanism. The present invention utilizing the frictional force to prevent rotation of the tilt bolt enables stepless adjustment and facilitates the assemblage of the tilt steering column assembly.

What is claimed is:

1. An assembly for supporting a steering column of a vehicle, comprising:

a bracket structure comprising a distance bracket member for supporting the steering column, and an upper clamp member for supporting the distance bracket member, said upper clamp member having first and second side walls each formed with an elongated aperture for allowing the distance bracket member to move between said first and second side walls to adjust a position of the steering column;

a tilt bolt passing through said distance bracket member and the elongated apertures of the upper clamp member, said tilt bolt having first and second end portions and an outward flange;

a tilt lever screwed on said first end portion of the tilt bolt; and an adjusting mechanism comprising a bolt rotation stopper and a stopper fixing nut, said bolt rotation stopper comprising a washer portion and an engaging portion, said washer portion having a hole that receives said second end portion of said tilt bolt and allowing said tilt bolt to rotate relative to said washer portion, said engaging portion engaging said bracket structure, said stopper fixing nut being screwed on said second end portion of the tilt bolt for fixing said stopper to said tilt bolt.

2. An assembly as claimed in claim 1, wherein said upper clamp member is adapted to be fixed to a vehicle body, said second end portion of said tilt bolt is formed with a screw thread, said engaging portion of said stopper engages one of said distance bracket member and said elongated aperture formed in said second side wall of said upper clamp member, and said washer portion and said engaging portion are integrally formed.

3. A steering column assembly as claimed in claim 1, wherein said second end portion of said tilt bolt has a non-circular portion for receiving a torque turning said tilt bolt.

4. An assembly as claimed in claim 1, wherein one of said outward flange of said tilt bolt and said washer portion of said stopper has a non-flat side surface formed with at least one rib.

5. An assembly as claimed in claim 1, wherein said washer portion of said stopper is clamped between said outward flange of said tilt bolt and said stopper fixing nut.

6. An assembly as claimed in claim 5, wherein said engaging portion of said stopper is configured to prevent rotation of said washer portion, and engaged with one of an engaging hole formed in said distance bracket member and said elongated aperture formed in said second side wall of said upper clamp member.

7. An assembly as claimed in claim 5, wherein said stopper fixing nut has an internally threaded through hole extending through said nut from a first open end opening in a first side of said stopper fixing nut and a second open end opening in a second side of said stopper fixing nut, and said second end portion of said tilt bolt has an axially extending noncircular portion and a polygonal cross-section.

8. An assembly as claimed in claim 7, wherein said noncircular portion of said tilt bolt is in a form of one of a noncircular recess and a non-circular projection.

9. An assembly as claimed in claim 5, wherein said outward flange of said tilt bolt is clamped between said second side wall of said upper clamp member and said washer portion of said stopper.

10. An assembly as claimed in claim 5, wherein the steering column is adapted to be fixedly mounted to said distance bracket, said distance bracket has first and second side walls, each with a through hole receiving said tilt bolt, and placed between said first and second side walls of said upper clamp member, and said upper clamp member is placed between said tilt lever and said outward flange of said tilt bolt.

11. An assembly as claimed in claim 5, wherein said engaging portion of said stopper extends along said tilt bolt toward said first end portion of said tilt bolt.

12. An assembly as claimed in claim 5, wherein said fixing nut has an outward flange abutting said stopper.

13. An assembly as claimed in claim 5, wherein one of said washer portion of said stopper and said outward flange of said tilt bolt has a non-flat side surface abutting on the other of said washer portion and said outward flange.

14. An assembly as claimed in claim 13, wherein said non-flat side surface is formed with a plurality of radial ridges radiating symmetrically around a center of said non-flat side surface.

15. An assembly as claimed in claim 1, wherein said outward flange is integrally formed with said tilt bolt.

16. An assembly as claimed in claim 1, wherein said outward flange of said tilt bolt abuts said second side wall of said upper clamp member to prevent passage of said tilt bolt through said elongated aperture formed in said second side wall.

17. An assembly for supporting a steering column of a vehicle, comprising:

a bracket structure comprising a distance bracket member for supporting the steering column, and an upper clamp member for supporting the distance bracket member, said upper clamp member having first and second side walls each formed with an elongated aperture for allowing the distance bracket member to move between said first and second side walls to adjust a position of the steering column;

tilt bolt passing through said distance bracket member and the elongated apertures of the upper clamp member, said tilt bolt having first and second end portions and an outward flange;

a tilt lever screwed on said first end portion of the tilt bolt; and an adjusting mechanism including a bolt rotation stopper with a washer portion mounted on said second end portion of said tilt bolt, and an engaging portion engaging said bracket structure, and a stopper fixing nut screwed on said second end portion of the tilt bolt for fixing said stopper to said tilt bolt, an adjusting mechanism comprising a bolt rotation stopper and a stopper fixing nut, said bolt rotation stopper comprising a washer portion and an engaging portion, said washer portion being mounted on said second end portion of said tilt bolt, said engaging portion engaging said bracket structure, said stopper fixing nut being screwed on said second end portion of the tilt bolt for fixing said stopper to said tilt bolt, wherein said washer portion of said stopper is clamped between said outward flange of said tilt bolt and said stopper fixing nut, and wherein said tilt lever comprises a clamping nut screwed on said first end portion of said tilt bolt.

18. An assembly as claimed in claim 17, wherein said outward flange of said tilt bolt comprises a non-serrated smooth outside circumferential surface, and wherein said washer portion of said stopper has a center hole with a non-serrated smooth inside circumferential surface.

19. An assembly as claimed in Claim 17, wherein said outward flange of said tilt bolt has an inner side surface abutting on said second side wall of said upper clamp member, an outer side surface abutting on said washer portion of said stopper, and an outside circumferential surface spaced from said stopper.

20. An assembly for supporting a steering column of a vehicle, comprising:

a bracket structure comprising a distance bracket member for supporting the steering column, and an upper clamp member for supporting the distance bracket member, said upper clamp member having first and second side walls each formed with an elongated aperture for allowing the distance bracket member to move between said first and second side walls to adjust a position of the steering column;

a tilt bolt passing through said distance bracket member and the elongated apertures of the upper clamp member, said tilt bolt having first and second end portions and an outward flange;

a tilt lever screwed on said first end portion of the tilt bolt; and an adjusting mechanism including a bolt rotation stopper with a washer portion mounted on said second end portion of said tilt bolt, and an engaging portion engaging said bracket structure, and a stopper fixing nut screwed on said second end portion of the tilt bolt for fixing said stopper to said tilt bolt, an adjusting mechanism comprising a bolt rotation stopper and a stopper fixing nut, said bolt rotation stopper comprising a washer portion and an engaging portion, said washer portion being mounted on said second end portion of said tilt bolt, said engaging portion engaging said bracket structure, said stopper fixing nut being screwed on said second end portion of the tilt bolt for fixing said stopper to said tilt bolt, wherein said washer portion of said stopper is clamped between said outward flange of said tilt bolt and said stopper fixing nut, wherein the steering column is adapted to be fixedly mounted to said distance bracket, said distance bracket has first and second side walls, each with a through hole receiving said tilt bolt, and placed between said first and second side walls of said upper clamp member, said upper clamp member is placed between said tilt lever and said outward flange of said tilt bolt, and wherein said second side wall of said distance bracket member has a projecting portion, said projecting portion and said engaging portion of said stopper project beyond said second side wall of said upper clamp member, and engage with each other; and wherein said projecting portion of said distance bracket member has an engaging hole, and said engaging portion of said stopper has an angled end engaging in said engaging hole of said distance bracket member.

21. An assembly for supporting a steering column of a vehicle, comprising:

a bracket structure comprising a distance bracket member for supporting the steering column, and an upper clamp member for supporting the distance bracket member, said upper clamp member having first and second side walls each formed with an elongated aperture for allowing the distance bracket member to move between said first and second side walls to adjust a position of the steering column;

a tilt bolt passing through said distance bracket member and the elongated apertures of the upper clamp member, said tilt bolt having first and second end portions and an outward flange;

a tilt lever screwed on said first end portion of the tilt bolt; and an adjusting mechanism including a bolt rotation stopper with a washer portion mounted on said second end portion of said tilt bolt, and an engaging portion engaging said bracket structure, and a stopper fixing nut screwed on said second end portion of the tilt bolt for fixing said stopper to said tilt bolt, an adjusting mechanism comprising a bolt rotation stopper and a stopper fixing nut, said bolt rotation stopper comprising a washer portion and an engaging portion, said washer portion being mounted on said second end portion of said tilt bolt, said engaging portion engaging said bracket structure, said stopper fixing nut being screwed on said second end portion of the tilt bolt for fixing said stopper to said tilt bolt, wherein said washer portion of said stopper is clamped between said outward flange of said tilt bolt and said stopper fixing nut, wherein the steering column is adapted to be fixedly mounted to said distance bracket, said distance bracket has first and second side walls, each with a through hole receiving said tilt bolt, and placed between said first and second side walls of said upper clamp member, said upper clamp member is placed between said tilt lever and said outward flange of said tilt bolt, and wherein said rotation stopper is formed with two of said engaging portions extending radially from said washer portion in diametrically opposite directions, and has angled ends received in said elongated aperture of said second side wall of said upper clamp member.

* * * * *